US011528762B2

(12) United States Patent
Kawai

(10) Patent No.: US 11,528,762 B2
(45) Date of Patent: Dec. 13, 2022

(54) INFORMATION PROCESSING APPARATUS AND CONTROL METHOD OF THE SAME

(71) Applicant: CANON KABUSHIKI KAISHA, Tokyo (JP)

(72) Inventor: Ryoya Kawai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 122 days.

(21) Appl. No.: 17/185,753

(22) Filed: Feb. 25, 2021

(65) Prior Publication Data

US 2021/0274577 A1    Sep. 2, 2021

(30) Foreign Application Priority Data

Feb. 28, 2020    (JP) .............................. JP2020-033879

(51) Int. Cl.
| | |
|---|---|
| *H04W 76/14* | (2018.01) |
| *H04W 4/50* | (2018.01) |
| *G06F 3/12* | (2006.01) |
| *H04W 76/19* | (2018.01) |
| *H04W 76/15* | (2018.01) |
| *H04W 88/08* | (2009.01) |

(52) U.S. Cl.
CPC ............ *H04W 76/14* (2018.02); *G06F 3/126* (2013.01); *G06F 3/1209* (2013.01); *G06F 3/1224* (2013.01); *H04W 4/50* (2018.02); *H04W 76/15* (2018.02); *H04W 76/19* (2018.02); *G06F 3/1292* (2013.01); *H04W 88/08* (2013.01)

(58) Field of Classification Search
CPC ..... H04W 76/14; H04W 76/19; H04W 76/15; H04W 4/50; H04W 88/08; G06F 3/1209; G06F 3/1224; G06F 3/126; G06F 3/1292; G06F 3/1288; G06F 3/1204; G06F 3/1238; G06F 3/1253; G06F 3/1297; G06F 3/1228; G06F 3/1284
See application file for complete search history.

(56) References Cited

U.S. PATENT DOCUMENTS

| | | | |
|---|---|---|---|
| 9,092,179 B2 * | 7/2015 | Uchikawa | ............. G06F 3/1209 |
| 2017/0017448 A1 * | 1/2017 | Hirata | ................. H04L 41/0803 |
| 2017/0351467 A1 * | 12/2017 | Wakabayashi | ............ G06F 9/48 |

FOREIGN PATENT DOCUMENTS

JP    2017219961 A    12/2017

* cited by examiner

*Primary Examiner* — Dung Hong
(74) *Attorney, Agent, or Firm* — Canon U.S.A., Inc. I.P. Division

(57) ABSTRACT

In a case where predetermined information is acquired by a first program using a first method, control is performed such that processing that is based on the predetermined information is executed by a second program based on an activation of the second program. In a case where the predetermined information is acquired by the first program using a second method, control is performed such that the processing that is based on the predetermined information is not executed by the second program even if the second program is activated.

20 Claims, 7 Drawing Sheets

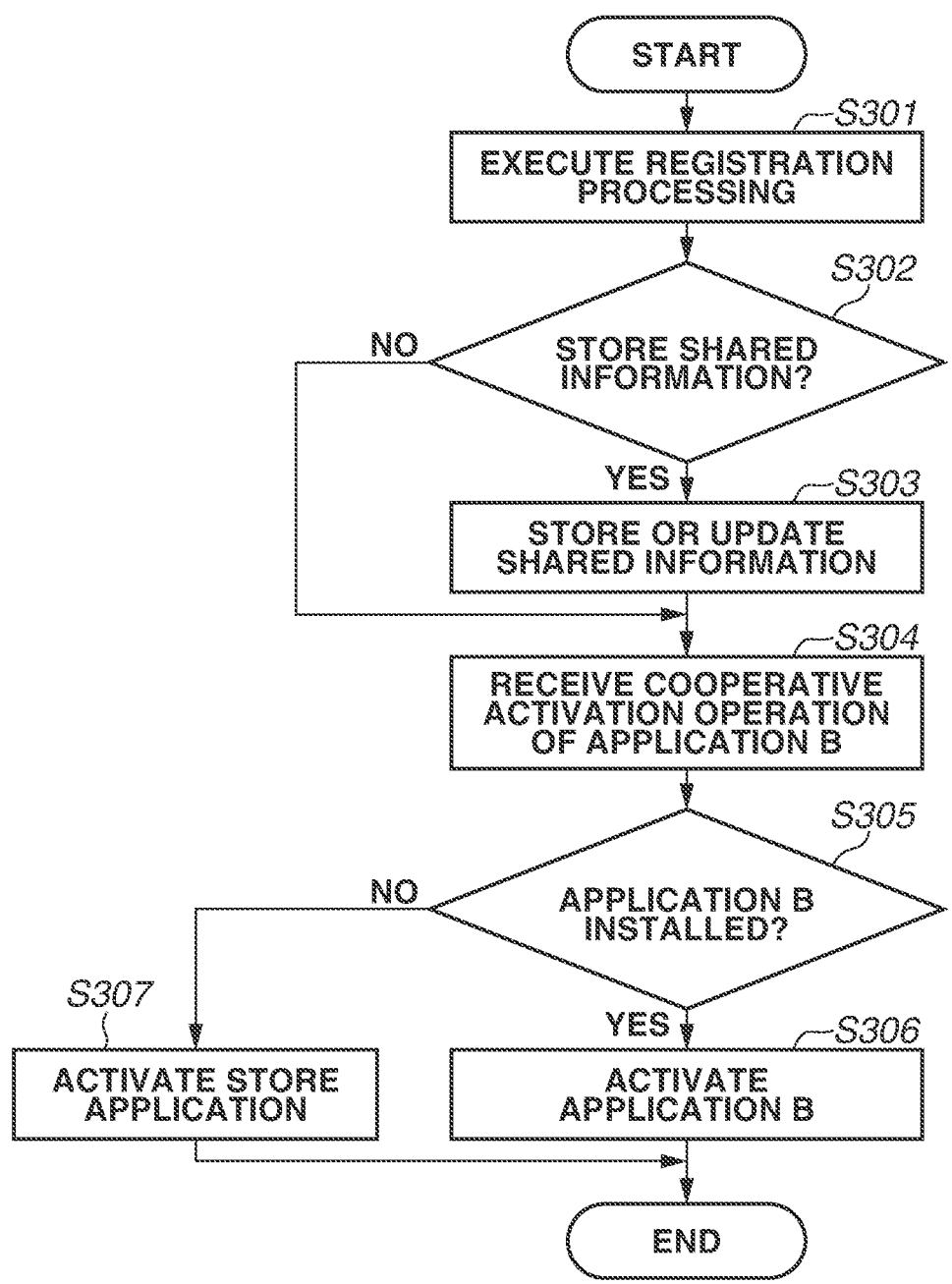

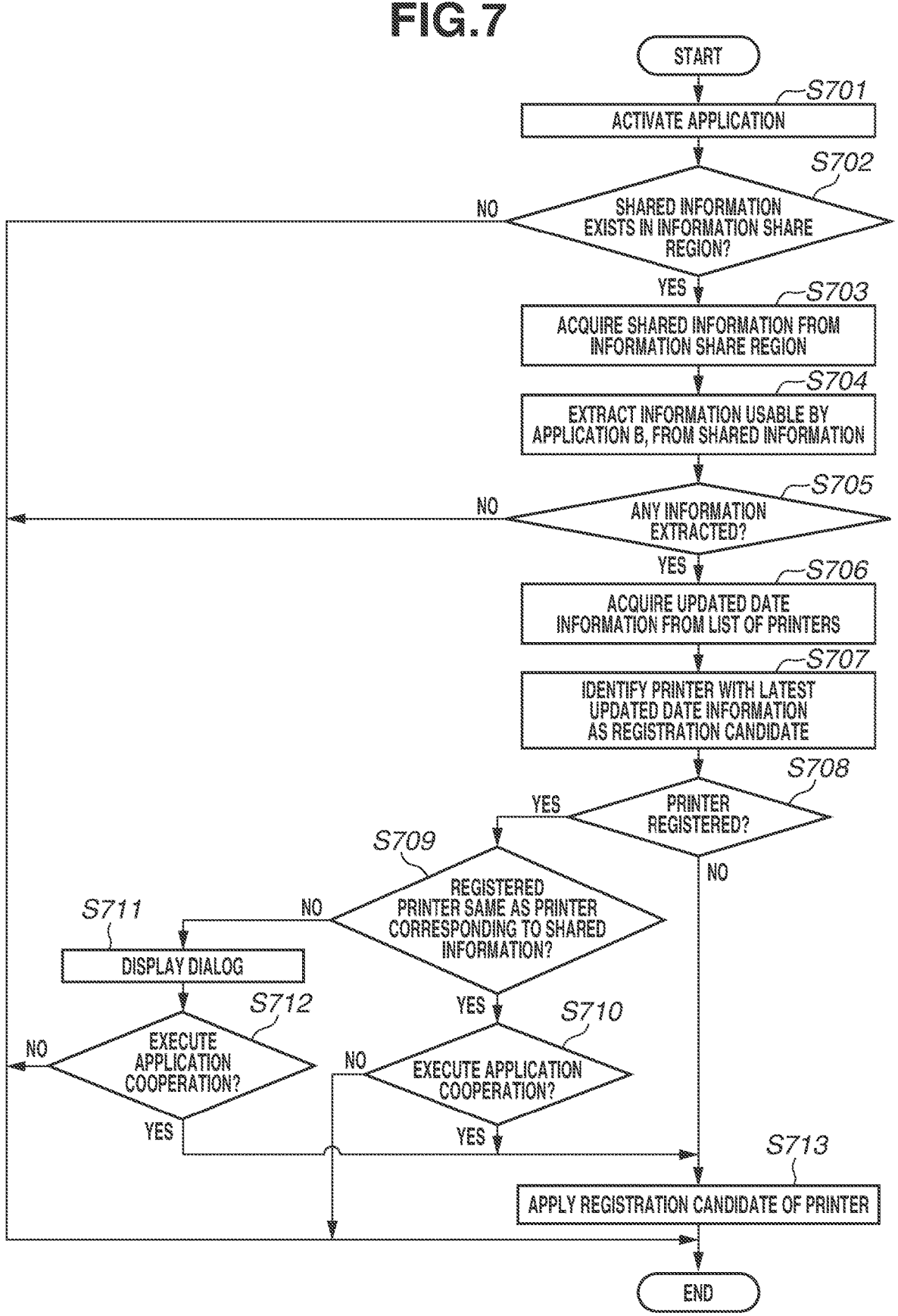

INFORMATION PROCESSING APPARATUS AND CONTROL METHOD OF THE SAME

BACKGROUND

Field of the Disclosure

The present disclosure relates to an information processing apparatus and a control method of the same.

Description of the Related Art

An information processing apparatus, such as a mobile terminal and a smartphone, has been known. The above-described information processing apparatus uses, in general, a program cooperation technique by which programs, such as applications installed on the information processing apparatus, operate cooperatively with each other. Specifically, the program cooperation technique enables, for example, processing based on information acquired by a predetermined program to be executed in a program different from the predetermined program.

Japanese Patent Application Laid-Open No. 2017-219961 discusses a technique of sharing information between a first application and a second application. In the technique, the first application stores, information required to be shared between the first application and the second application in an information share region, and the second application acquires the shared information from the information share region.

SUMMARY

According to an aspect of the present disclosure, a control method of an information processing apparatus includes acquiring predetermined information regarding a communication apparatus using a first program, and executing processing that is based on the predetermined information acquired by the first program using the second program, based on an activation of a second program different from the first program. In a case where the predetermined information is acquired by the first program using a first method, control is performed such that the processing that is based on the predetermined information is executed by the second program based on the activation of the second program. In a case where the predetermined information is acquired by the first program using a second method different from the first method, control is performed such that the processing that is based on the predetermined information is not executed by the second program even if the second program is activated.

Further features of the present disclosure will become apparent from the following description of exemplary embodiments with reference to the attached drawings.

BRIEF DESCRIPTION OF THE DRAWINGS

FIG. 3 is a flowchart illustrating a processing flow executed by the mobile terminal using an application A.

FIG. 7 is a flowchart illustrating a processing flow executed by the mobile terminal using the application B.

DESCRIPTION OF THE EMBODIMENTS

An information processing apparatus according to an exemplary embodiment of the present disclosure will be described below in detail with reference to the drawings. The following exemplary embodiments are not intended to limit the present disclosure set forth in the appended claims, and not all the combinations of features described in the present exemplary embodiment are always essential to the solution of the present disclosure.

An information processing apparatus to which the present disclosure is applied will now be described. In a first exemplary embodiment, a mobile terminal is exemplified as an information processing apparatus. However, the information processing apparatus is not limited to the mobile terminal. Various apparatuses on which programs can be installed are applicable to the information processing apparatus; examples of the various apparatuses include a laptop personal computer (PC), a tablet terminal, a personal digital assistant (PDA), a digital camera, a music reproduction device, and a television set. In the present exemplary embodiment, a smartphone is exemplified as an example of a mobile terminal. A smartphone is a multifunctional mobile phone equipped with, for example, a camera function, an internet browser function, and e-mail function, in addition to a mobile phone function.

Figure 1A:
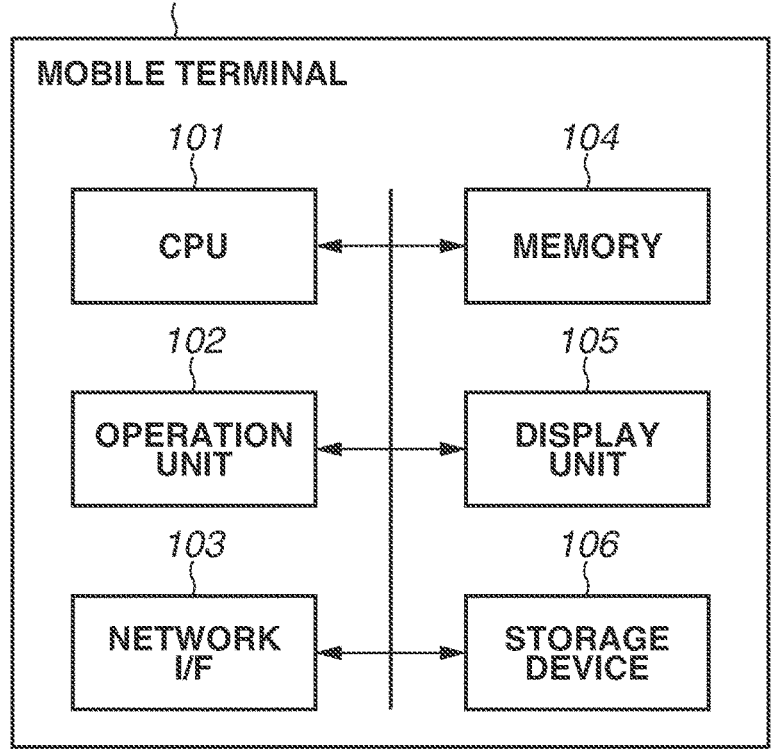
FIGS. 1A and 1B illustrate a configuration of a mobile terminal.
Figure 1B:
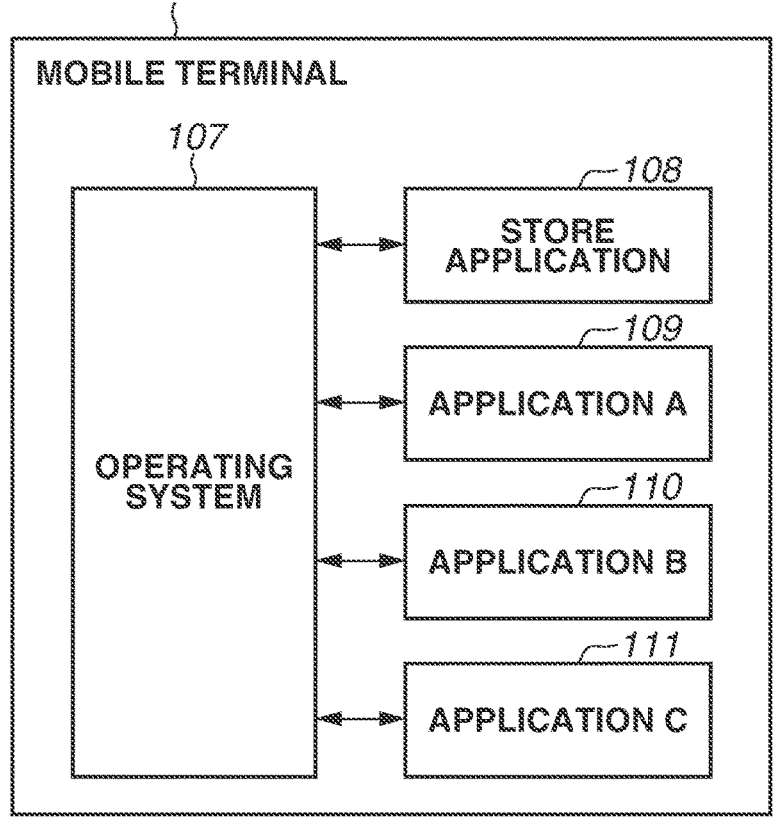

FIGS. 1A and 1B illustrate a configuration of a mobile terminal 100, which is an information processing apparatus according to the present exemplary embodiment. FIG. 1A illustrates a hardware configuration of the mobile terminal 100. FIG. 1B illustrates a software configuration of the mobile terminal 100.

The mobile terminal 100 includes a central processing unit (CPU) 101, an operation unit 102, a network interface (I/F) 103, a memory 104, a display unit 105, and a storage device 106. These units are connected with each other via a system bus.

The CPU 101 controls the entire mobile terminal 100. The operation unit 102 is an operation unit to which a user issues an instruction for the mobile terminal 100. The operation unit includes a button and a touch panel.

The memory 104 is a random access memory (RAM) serving as a working area of the CPU 101. The memory 104 works as a temporary storage region for various types of received data, and stores various types of setting data.

The storage device 106 is, for example, a flash memory. The storage device 106 stores various control programs, such as an application and an operating system (hereinafter, referred to as "OS").

The network I/F 103 is an interface for connecting with a network. The mobile terminal 100 can be connected to a network via the network I/F 103. Through the network, the mobile terminal 100 can be connected to an external device, such as a printer, or the Internet. In the present exemplary embodiment, the network I/F 103 can execute communication complying with the Institute of Electrical and Electronics Engineers (IEEE)802.11 series (communication via Wi-Fi®). However, the communication is not limited to these series, and other communication methods, such as Bluetooth®, can be adopted by the network I/F 103. The mobile terminal 100 may include a plurality of network interfaces. The mobile terminal 100 may include a network interface that can execute communication via Bluetooth® Low Energy (hereinafter, referred to as BLE), aside from the network I/F 103. The mobile terminal 100 may also include a network interface that can execute communication via Near Field Communication (NFC).

The display unit 105, which includes a liquid crystal panel, is configured to display various types of information. The operation unit 102 is configured to receive an operation from the user. In the present exemplary embodiment, the operation unit 102 and the display unit 105 are the same component. These units are configured to perform, with one component, both receiving an operation by the user and displaying various types of information. In other words, the operation unit 102 and the display unit 105 are formed as a touch display. The user can operate the mobile terminal 100 and issue various instructions to the mobile terminal 100 by moving a finger along the touch display or tapping the touch display. The user can also issue various instructions to the mobile terminal 100 by operating the touch display, without touching with a finger, using an electrostatic touch panel pen, such as a stylus pen. The operation unit 102 and the display unit 105 can be separate. For example, the operation unit 102 can be a physical keyboard having physical keys.

As illustrated in FIG. 1B, in the present exemplary embodiment, the mobile terminal 100 can use an OS 107, a store application program 108, and three or more application programs. As the three or more application programs, the mobile terminal 100 can use an application program A 109, an application program B 110, and an application program C 111. Hereinafter, an "application program" will be referred to as an "application". In the following description, processing executed by an application is implemented by the CPU 101 reading the application into the memory 104 and executing the application.

Figure 5:
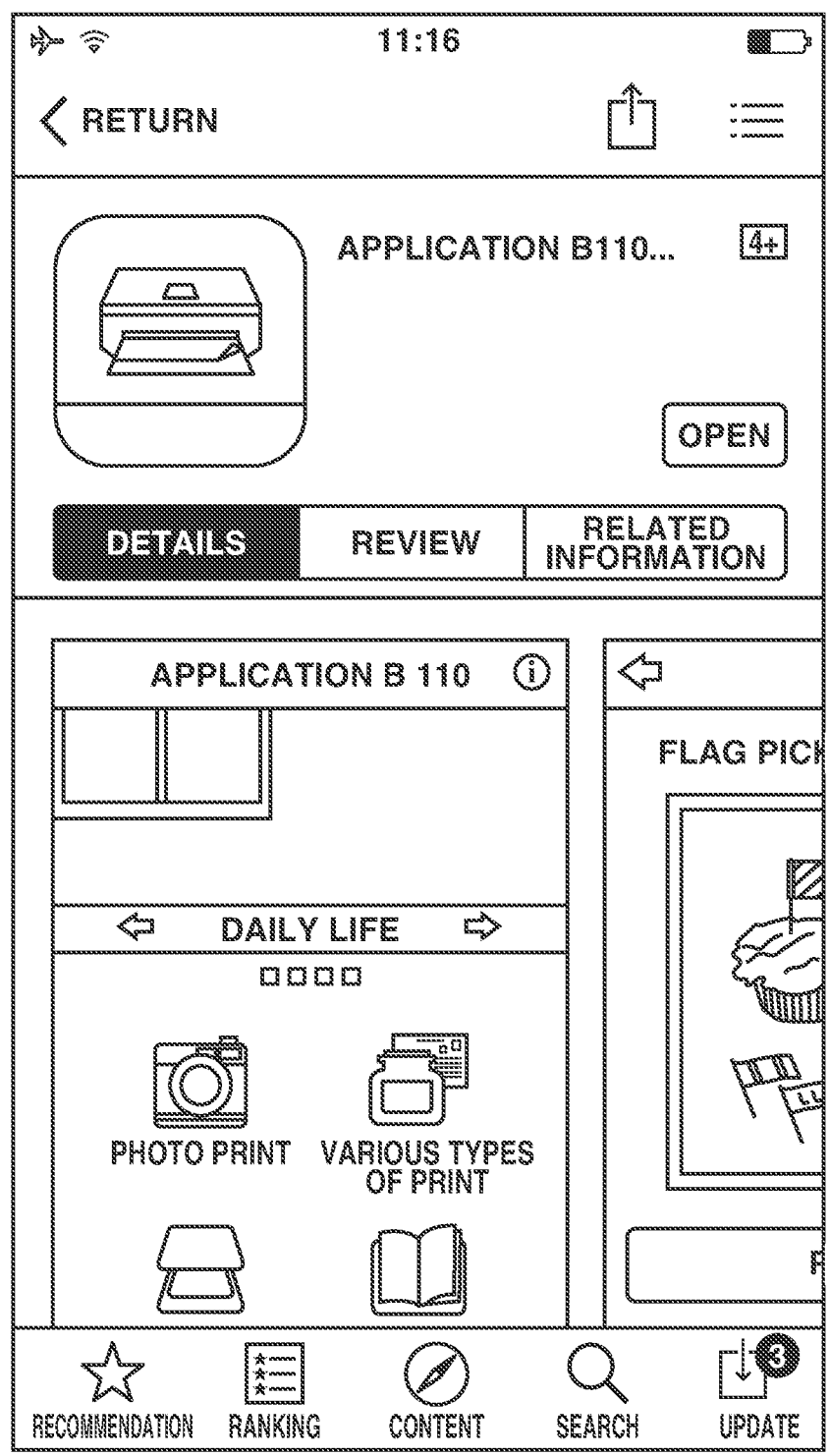
FIG. 5 illustrates an example of a screen displayed by a store application.

The store application 108 downloads and installs another application, such as the application A 109, the application B 110, or the application C 111, onto the mobile terminal 100. The user uses the store application 108 to select a desired application, and performs a predetermined operation to download the selected application. The operation includes tapping a download button, and password authentication. The user can thereby download and install the selected application onto the mobile terminal 100. The user can also activate, via the store application 108, an application already installed on the mobile terminal 100 by performing a predetermined operation (e.g., tapping an "open" button) on a screen displayed by the store application 10. FIG. 5 illustrates an example of a screen displayed by the store application 108. FIG. 5 illustrates a screen for activating the application B 110 in a state where the application B 110 is already installed on the mobile terminal 100. As described above, the application B 110 is activated when the "open" button is tapped. Similarly to the application B 110, the application C 111 can also be downloaded, installed, and activated from the store application 108.

The application A 109, the application B 110, and the application C 111 are downloaded by the store application 108 onto the mobile terminal 100 via a network. The application A 109, the application B 110, and the application C 111 can be downloaded from, for example, a storage medium storing the applications instead of being downloaded via the store application 108. The application B 110 and the application C 111 may be downloaded via, for example, a web browser. A downloaded application is installed onto the mobile terminal 100, and the application becomes usable in the mobile terminal 100. The application A 109 may be stored in the mobile terminal 100 in advance before the shipment of the mobile terminal 100. In the present exemplary embodiment, the application A 109, the application B 110, and the application C 111 transmit a print job to a printer having a printing function, and cause the printer to execute printing based on the transmitted print job. The application A 109, the application B 110, and the application C 111 may have another function in addition to the function of causing the printer to execute printing. The application A 109, the application B 110, and the application C 111 may have a function of transmitting a scan job to a printer, and causing the printer to execute scanning based on the transmitted scan job.

The store application 108, the application A 109, the application B 110, and the application C 111 operate via the OS 107. These pieces of software are stored in the storage device 106, loaded onto the memory 104, and executed by the CPU 101.

In the present exemplary embodiment, the applications A 109 and B 110, and the applications A 109 and C 111 cooperatively operate. Specifically, the application B 110 operates using information used by the application A 109. The application C 111 operates using information used by the application A 109. Hereinafter, the cooperative operation of programs will be referred to as program cooperation. In particular, the cooperative operation of applications will be referred to as application cooperation. Specifically, the application cooperation is a technique to make processing executed based on information (e.g., shared information described below) used in, for example, the application A 109 executable in another program (e.g., the application B 110) that can be activated by the application A 109.

In the present exemplary embodiment, activation methods for applications include independent activation and cooperative activation. The independent activation is executed, for example, when an application icon is tapped on a home screen displayed by an OS, or an operation is performed on a screen displayed by the store application 108. In the present exemplary embodiment, the store application 108, the application A 109, the application B 110, and the application C 111 each can be independently activated. The cooperative activation is executed when a certain application is activated in response to an operation performed on a screen displayed by another application. The other application shares information (shared information described below) to be used by the certain application. In the present exemplary embodiment, at least the application B 110 and the application C 111 can be cooperatively activated in response to an operation performed on a screen displayed by the application A 109. When the application B 110 or the application C 111 is cooperatively activated, the activated application B 110 or C 111 is notified of information of an application (the application A 109), which has triggered the cooperative activation. Thus, the CPU 101 can identify which of the cooperative activation and the independent activation has been used as an activation method for the application B 110 or the application C 111.

Figure 6:
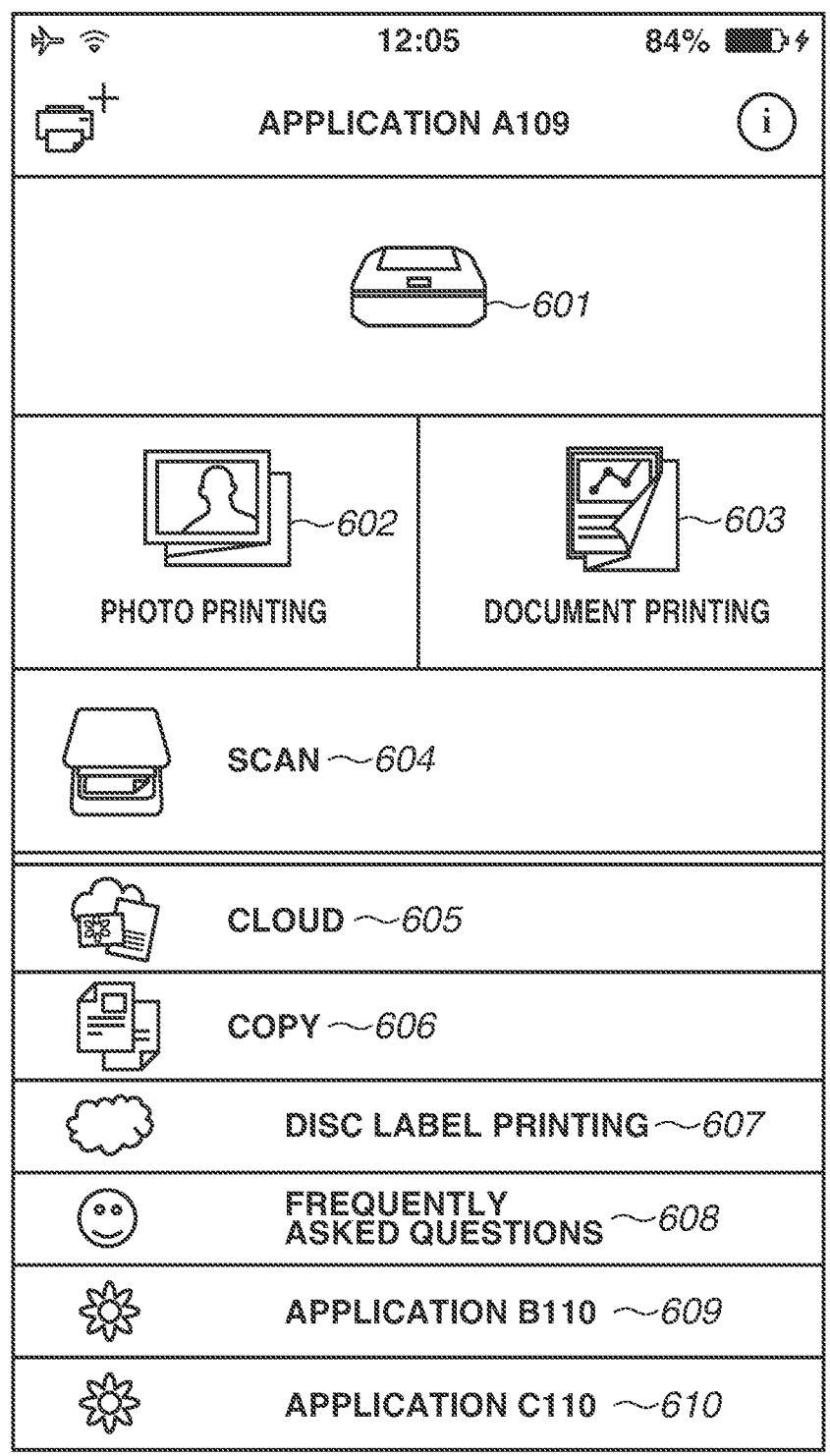
FIG. 6 illustrates an example of a screen displayed by the application A.

FIG. 6 illustrates an example of a screen displayed by the application A 109. An icon 601 indicates a printer registered in the application A 109. The registration of a printer will be described below. In a state where no printer is registered in the application A 109, the icon 601 is not displayed. At this time, a message for prompting the registration of a printer or a region including the icon may be displayed in place of the icon 601. Icons 602 and 603 are buttons for transmitting a print job to the printer registered in the application A 109, and causing the printer to print a photo or a document stored in the mobile terminal 100. An icon 604 is a button for transmitting a scan job to the printer registered in the application A 109, and causing the printer to execute scanning. An icon 605 is a button for executing a cloud print function of causing the printer to print image data stored in an external server. An icon 606 is a button for transmitting a copy to the printer registered in the application A 109, and causing the printer to create a copy of a document. An icon 607 is a button for transmitting a print job to the printer, and causing the printer to execute printing onto a disc medium. For executing, for example, printing onto a disc medium, another application (e.g., application for disc medium printing) different from the application A 109 is required in some cases. In such cases, the CPU 101 cooperatively activates the application for disc medium printing, if the CPU 101 receives an operation on the icon 607 in a state where the application for disc medium printing is installed in the mobile terminal 100. An icon 608 is a button for opening a web page explaining an operation method of the application A 109. An icon 609 is a button for cooperatively activating the application B 110. The CPU 101 cooperatively activates the application B 110 if the CPU 101 receives an operation on the icon 609 in a state where the application B 110 is installed in the mobile terminal 100. If a printer not supporting, for example, the application B 110 is registered in the application A 109, the CPU 101 may avoid receiving an operation performed on the icon 609 by bringing the icon 609 into a grayout state or hiding the icon 609. An icon 610 is a button for cooperatively activating the application C 111. If the CPU 101 receives an operation performed on the icon 610 in a state where the application C 111 is installed in the mobile terminal 100, the CPU 101 cooperatively activates the application C 111. If a printer not supporting, for example, the application C 111 is registered in the application A 109, the CPU 101 may avoid receiving an operation on the icon 610 by bringing the icon 610 into a grayout state or hiding the icon 610.

The application A 109 is an application for causing a printer to execute printing based on image data selected by the user, among image data obtained by image capturing performed by the mobile terminal 100, and image data downloaded by the mobile terminal 100. In contrast, the application B 110 is an application for causing a printer to execute printing based on image data prestored, for example, in the application B 110. The application B 110 is also an application for causing a printer to execute printing based on image data acquired, for example, by the application B 110 via a network from an external server supporting the application B 110. The application B 110 may be, for example, an application for disc medium printing or an application for causing a printer to print New Year's greeting cards. Similarly to the examples of the application B 110, the application C 111 may be an application having various functions.

As described above, in the present exemplary embodiment, the application A 109, the application B 110, and the application C 111 have a printing function for causing a printer with which the mobile terminal 100 can communicate, to print an image. The application A 109, the application B 110, and the application C 111 can execute the print function by searching for printers existing near the mobile terminal 100, and registering a device caused to execute printing, among discovered devices. The processing (registration processing) for registering a device in an application is referred to processing (setting processing) for setting and registering a registration target device as a device with which the application communicates. In this configuration, information (hereinafter, referred to as registration information) regarding a printer registered in the application A 109, for example, can be applied as shared information 202. Specifically, the registration information includes model information, such as a media access control address (MAC) address, a Bonjour name, an internet protocol (IP) address, and a model name of a printer, capability information, such as a usable setting value, and information regarding registration date and time. The registered date and time is date and time on which, for example, registration information is acquired. When a printer is registered in the application A 109, the icon 601 is displayed on a screen displayed by the application A 109, and the type of the printer registered in the application A 109 is presented to the user. Thus, the icon 601 may include information indicating a name or a model number of the printer registered in the application A 109, a state of ink stored in the printer registered in the application A 109, or an error state of the printer registered in the application A 109.

In response to a registration of a printer in the application A 109, for example, the CPU 101 stores registration information of the printer in an information share region 201, as the shared information 202. The CPU 101 can thereby execute, by the application B 110, processing for registering the printer registered in the application A 109, in the application B 110, as processing based on the shared information 202 stored at the time of activation of the application B 110. With such a configuration, the CPU 101 can register the printer in the application B 110, for example, without executing processing of searching for a printer, by the application B 110. If not all pieces of information necessary for registering a printer can be stored in the information share region 201, at least part of the information necessary for registering the printer may be used as the shared information 202. Even in such a configuration, an effect of reducing a time taken for processing of searching for a printer, for example, can be obtained. The application C 111 can also execute the above-described registration of a printer using the shared information 202.

A plurality of methods may be used for registering printers. In other words, the registration method is an acquisition method of registration information of a printer. A first registration method executable by the application A 109 will now be described. The application A 109 uses the first registration method to search a Wi-Fi network to which the mobile terminal 100 belongs for a printer corresponding to the application A 109. The Wi-Fi network to which the mobile terminal 100 belongs is, for example, a network constructed by one or more wireless local area network (LAN) routers (external access points). The mobile terminal 100 connects to the network via Wi-Fi. The application A 109 acquires, via the Wi-Fi network, registration information from a printer selected by the user from among printers discovered through the search. The application A 109 then registers the printer selected by the user in the application A 109. Specifically, the printers discovered through the search are printers connected via Wi-Fi to a wireless LAN router to which the mobile terminal 100 connects via Wi-Fi, for example. If the application A 109 discovers only one printer through the search, the application A 109 may automatically register the printer without making an inquiry to the user. If the application A 109 discovers a plurality of printers through the search, the application A 109 may register all of the discovered printers. In the present exemplary embodiment, in response to the registration of the printer(s) in this manner, the application A 109 stores registration information of the printer(s) in the information share region 201 as the shared information 202.

In some cases, the Wi-Fi network to which the mobile terminal 100 belongs is a network formed between a printer and the mobile terminal 100 based on the Wi-Fi Direct standard. In other words, the mobile terminal 100 establishes wireless connection (peer-to-peer (P2P) connection) with a printer, in compliance with the Wi-Fi Direct standard not via a wireless LAN router. Also in this case, search for a printer is performed on the Wi-Fi network to which the mobile terminal 100 belongs, but only one printer is discovered as a matter of course. The application A 109 acquires registration information from the printer discovered in the search via the network complying with the Wi-Fi Direct standard, thereby registering the printer in the application A109. In the present exemplary embodiment, however, the application A 109 does not store the registration information of the printer in the information share region 201 as the shared information 202 in response to the registration of the printer with which the mobile terminal 100 connects based on the Wi-Fi Direct standard. This is because some applications cannot execute communication complying with the Wi-Fi Direct standard. For example, in the present exemplary embodiment, the application B 110 cannot execute communication complying with the Wi-Fi Direct standard.

A second registration method executable by the application A 109 will now be described. The application A 109 searches for a printer that exists near the mobile terminal 100 and has enabled a predetermined access point, via Wi-Fi. The printer enables a predetermined access point when a predetermined operation for performing Wi-Fi setup is received from the user, or when initial setup is performed after unpacking. The application A 109 establishes wireless connection (P2P connection) between the mobile terminal 100 and a printer selected by the user from among printers discovered through the search, via Wi-Fi not via a wireless LAN router. At this time, if the application A 109 discovers only one printer through the search, the application A 109 may automatically establish P2P connection with the printer without making an inquiry to the user. The application A 109 then performs Wi-Fi setup of the printer wirelessly connected with the mobile terminal 100 via Wi-Fi.

As Wi-Fi setup, the application A 109 connects the printer and the wireless LAN router via Wi-Fi, for example, by transmitting connection information for connecting with a wireless LAN router to the printer via the P2P connection. After that, the mobile terminal 100 can perform Wi-Fi communication with the printer via the wireless LAN router, in a case where the mobile terminal 100 also belongs to a Wi-Fi network composed of the wireless LAN router. Thus, the application A 109 connects a printer and a wireless LAN router via Wi-Fi and then acquires registration information from the printer via the wireless LAN router, thereby registering the printer in the application A 109. At this time, the application A 109 maintains Wi-Fi connection between the wireless LAN router and the mobile terminal 100 without disconnection. The application A 109 can thereby transmit a print job to the printer via the wireless LAN router. In the present exemplary embodiment, the application A 109 stores registration information of the printer in the information share region 201 as the shared information 202 in response to the registration of the printer in this manner.

When performing Wi-Fi setup, the application A 109 receives, from the printer, connection information for connecting with another access point (an internal access point of the printer) that is different from the predetermined access point and is to be enabled in the printer, for example. After transmitting the connection information to the application A 109, the printer enables the other access point. The application A 109 uses the received connection information and establishes wireless connection (P2P connection) between the mobile terminal 100 and the printer, which has enabled the other access point, via Wi-Fi not via a wireless LAN router. The application A 109 then acquires registration information from the printer via the P2P connection, thereby registering the printer in the application A 109. The application A 109 maintains the P2P connection without disconnection. The application A 109 can thereby transmit a print job to the printer via the P2P connection. In the present exemplary embodiment, the application A 109 stores registration information of the printer in the information share region 201 as the shared information 202 in response to the registration of the printer in this manner.

The above description has given a configuration of executing Wi-Fi setup by connecting the mobile terminal 100 and a printer via Wi-Fi. However, the connection method is not limited to the connection method used in this configuration. For example, a configuration of executing Wi-Fi setup by connecting the mobile terminal 100 and a printer via BLE may be employed. In this case, for example, the application A 109 searches for a printer that exists near the mobile terminal 100 and has enabled a BLE communication function, via Wi-Fi. Specifically, the printer that has enabled a BLE communication function is, for example, a printer operating as an advertiser based on the BLE standard. The application A 109 establishes wireless connection (BLE connection) via BLE between the mobile terminal 100 and a printer selected by the user from among printers discovered through the search. At this time, if the application A 109 discovers only one printer through the search, the application A 109 may automatically connect with the printer via BLE without making an inquiry to the user. The application A 109 then performs Wi-Fi setup of the printer wirelessly connected with the mobile terminal 100 via BLE. The application A 109 may have both a function of executing Wi-Fi setup via Wi-Fi connection and a function of executing Wi-Fi setup via BLE connection.

A third registration method executable by the application A 109 will now be described. The application A 109 searches for a printer that exists near the mobile terminal 100 and operates as an advertiser in the BLE standard, via BLE. The application A 109 wirelessly connects, via BLE, the mobile terminal 100 and a printer selected by the user from among printers discovered through the search. The application A 109 acquires, from the printer connecting with the mobile terminal 100 via BLE, connection information for establishing P2P connection with the printer via Wi-Fi. Specifically, the connection information includes a service set identifier (SSID) of an access point to be enabled in the printer, and a password used for connecting with the access point. Thereafter, the application A 109 uses the acquired connection information, thereby establishing wireless connection (P2P connection) between the mobile terminal 100 and the printer that has enabled the access point, via Wi-Fi not via a wireless LAN router. The application A 109 acquires registration information from the printer wirelessly connected with the mobile terminal 100, via P2P connection, thereby registering the printer in the application A 109. If the application A 109 discovers only one printer through the search, the application A 109 may automatically connect with the printer via BLE without making an inquiry to the user and automatically register the printer. When the registration ends, the application A 109 disconnects the P2P connection between the printer and the mobile terminal 100. After that, if a printing instruction is issued by the user, the application A 109 re-establishes P2P connection between the printer and the mobile terminal 100 using the connection information again, and transmits a print job. The third registration method may be executed, for example, in response to the fact that no printer has been discovered through the printer search in the first registration method. In the present exemplary embodiment, the application A 109 does not store registration information of the printer in the information share region 201 as the shared information 202 in response to the registration of the printer by the third registration method. This is because the printer cannot be easily used by an application other than the application A 109 since P2P connection between the printer and the mobile terminal 100 is disconnected after the printer is registered by the third registration method.

A fourth registration method executable by the application A 109 will now be described. The application A 109 searches for a printer that exists near the mobile terminal 100 and operates as a P2P device or a group owner based on the Wi-Fi Direct standard. The P2P device based on the Wi-Fi Direct standard is a device that is neither a group owner nor a client and does not execute group owner negotiation. At this time, the application A 109 searches for a printer by a known discovery process based on the Wi-Fi Direct standard. The application A 109 wirelessly connects the mobile terminal 100 and a printer selected by the user from among printers discovered through the search, in compliance with the Wi-Fi Direct standard not via a wireless LAN router. At this time, if the application A 109 discovers only one printer through the search, the application A 109 may automatically connect with the printer wirelessly in compliance with the Wi-Fi Direct standard without making an inquiry to the user. The application A 109 acquires registration information from the printer wirelessly connected with the mobile terminal 100 in compliance with the Wi-Fi Direct standard, via the wireless connection, thereby registering the printer in the application A 109. Even after the registration, the wireless connection between the printer and the mobile terminal 100 based on the Wi-Fi Direct standard is maintained. In the present exemplary embodiment, the application A 109 does not store registration information of the printer in the information share region 201 as the shared information 202 in response to the registration of the printer using the fourth registration method. This is because some applications cannot execute communication complying with the Wi-Fi Direct standard.

A fifth registration method executable by the application A 109 will now be described. The application A 109 can execute communication based on NFC. When the mobile terminal 100 approaches a printer in a state in which image data is selected in the application A 109, the application A 109 acquires, from the printer through NFC communication, connection information for establishing Wi-Fi connection with the printer. Specifically, the connection information includes an SSID of an access point to be enabled in the printer, and a password used for connecting with the access point. Thereafter, the application A 109 uses the acquired connection information and establishes wireless connection (P2P connection) between the printer and the mobile terminal 100, via Wi-Fi not via a wireless LAN router. Before the wireless connection, the application A 109 may issue an instruction for enabling an access point in the printer, via NFC communication. By acquiring registration information from the printer via the P2P connection, the application A 109 registers the printer in the application A 109. The application A 109 transmits a print job for causing the printer to print the selected image data, to the printer via the P2P connection. When the transmission of the print job is completed, the application A 109 disconnects the P2P connection between the printer and the mobile terminal 100. In the present exemplary embodiment, the application A 109 does not store registration information of the printer in the information share region 201 as the shared information 202 in response to the registration of the printer using the fifth registration method. This is because the printer cannot be easily used by an application other than the application A 109 since the P2P connection between the printer and the mobile terminal 100 is disconnected after the printer is registered by the fifth registration method. The communication executed via NFC in the fifth registration method may be executed via Classic Bluetooth or BLE in place of NFC.

As described above, in the present exemplary embodiment, if a printer is registered in the application A 109, while registration information of the printer is stored as the shared information 202 in some cases, the registration information of the printer is not stored in other cases depending on the registration method. With such a configuration, only registration information of an appropriate printer to be used in application cooperation can be made usable by another application as the shared information 202.

The above description has been given patterns in which, even if a printer is registered in the application A 109, registration information of the printer is not stored as the shared information 202. However, these patterns may include a pattern in which registration information of the printer is stored as the shared information 202. In other words, it is sufficient that registration information of the printer is not stored in the information share region 201 as the shared information 202 in at least one pattern of the above-described patterns. Thus, registration information of the printer may be stored in the information share region 201 as the shared information 202 in response to the registration of the printer using, for example, the third registration method or the fourth registration method.

In the present exemplary embodiment, the shared information 202 is updated each time a printer is newly registered in the application A 109 in a state where the shared information 202 is already stored in the information share region 201. The shared information 202 is not updated in the pattern where the shared information 202 is not stored. Even in a case where the same printer as the already-registered printer is newly registered, the shared information 202 may not be updated.

By registration processing being performed on a plurality of printers, the plurality of printers may be registered in one application. In this case, the application A 109 transmits a print job to a printer selected as a selected device from among the plurality of registered printers. On a screen displayed by the application A 109, the user can appropriately select or change a selected device from among the plurality of registered printers. If a different printer is newly registered in a state where a certain printer is already selected as a selected device, the newly-registered printer is selected as a selected device regardless of a registration method. On the screen illustrated in FIG. 6, the icon 601 corresponding to a printer selected as a selected device is displayed. The icon 601 corresponding to a registered printer unselected as a selected device is not displayed.

In the case of a configuration in which a plurality of printers can be registered in one application, registration information regarding the plurality of registered printers may be stored in the information share region 201 as the shared information 202. In contrast, only registration information regarding one printer (e.g., a printer selected as a selected device) among the plurality of registered printers may be stored in the information share region 201 as the shared information 202. For example, in a state where the printer A is registered by the second registration method and the registration information regarding the printer A is stored in the information share region 201 as the shared information 202, it is assumed that a printer B is newly registered by the second registration method. In this case, both the printer A and the printer B are registered in the application A 109, but the shared information 202 to be stored in the information share region 201 is updated to registration information regarding the newly-registered printer B. Thereafter, it is assumed that the printer A is subsequently selected by the user as a selected device. In this case, the shared information 202 stored in the information share region 201 is updated to the registration information regarding the printer A. Further, in a state where the printer A is registered by the second registration method and the registration information regarding the printer A is stored in the information share region 201 as the shared information 202, it is assumed that the printer B is newly registered by the pattern in which the shared information 202 is not stored. As described above, the pattern in which the shared information 202 is not stored is a pattern in which the printer B is registered by the third registration method or the fourth registration method, for example. In this case, both the printer A and the printer B are registered in the application A 109, but the shared information 202 stored in the information share region 201 is not updated to the registration information regarding the printer B, and remains unchanged from the registration information regarding the printer A.

In the present exemplary embodiment, the application A 109 can perform registration based on each of the plurality of registration methods. However, the application B 110 and the application C 111 can perform only registration based on the first registration method. In other words, the application A 109 has a higher-performance registration function as compared with those of the application B 110 and the application C 111. The application B 110 and the application C 111 may be enabled to perform registration based on a registration method other than the first registration method.

When an application (e.g., the application B 110) other than the application A 109, which has stored the shared information 202, is activated, the shared information 202 stored as described above is acquired by the application. If the application uses the shared information 202, the application A 109 and the application other than the application A 109 can share information. Further, it becomes possible to register, in the application B 110 or the application C 111, a printer that cannot be registered by a registration method executable by the application B 110 or the application C 111.

In another configuration, for example, the application B 110 deletes the shared information 202 from the information share region 201 after the application B 110 acquires the shared information 202. In this configuration, if the application C 111 is cooperatively activated by the application A 109 after the application B 110 acquires the shared information 202, the application C 111 may occasionally fail to acquire the shared information 202. In view of the foregoing, in the present exemplary embodiment, the description will be given of a configuration in which the application C 111 can acquire the shared information 202 even in a case where the application C 111 is cooperatively activated by the application A 109 after the application B 110 acquires the shared information 202.

A use case of cooperatively activating the application B 110 via the application A 109 in a state where the application A 109 and the application B 110 are already installed in the mobile terminal 100 will be described with reference to FIG. 2A. If the CPU 101 identifies that a printer is registered (registration information of a printer is generated) by registration processing of a printer, the CPU 101 stores the generated registration information in the information share region 201 as the shared information 202. The shared information 202 is information usable by the CPU 101 in an operation of the application A 109. The information share region 201 is a storage region in which the shared information 202 is stored. The information share region 201 may be a shared folder accessible in both states of an operating state of the application A 109 and an operating state of the application B 110, or may be a clipboard or pasteboard managed by the OS 107. The shared folder may be a region included in a memory in the mobile terminal 100, such as the storage device 106, may be a region included in an external storage medium, such as a secure digital (SD) card or a hard disc drive (HDD), or may be a region on a network server. The configuration of the shared folder is not limited as long as the shared folder is configured to store information usable in both states of an operating state of the application A 109 and an operating state of the application B 110.

When the CPU 101 identifies that the application B 110 is to be cooperatively activated, for example, through reception of an operation on the icon 609, the CPU 101 cooperatively activates the application B 110. After the CPU 101 cooperatively activates the application B 110, the CPU 101 acquires the shared information 202 using the application B 110 by referring to the information share region 201. The CPU 101 then determines whether the acquired shared information 202 is information usable by or applicable to the application B 110. Hereinafter, the determination will be referred to as availability determination. If the CPU 101 determines that the shared information 202 is information usable by the application B 110, the CPU 101 executes processing based on the shared information 202. In contrast, if the CPU 101 determines that the shared information 202 is not information usable by the application B 110, the CPU 101 does not execute the processing based on the shared information 202.

The availability determination is executed using information included in the acquired shared information 202. For example, a model name of a printer is included in the shared information 202. In this case, the CPU 101 determines, as the availability determination, whether a model name list of printers supporting the application B 110 includes a model name included in the shared information 202. If the model name list includes a model name included in the shared information 202, the CPU 101 determines that the acquired shared information 202 is information usable by the application B 110. If the model name list does not include a model name included in the shared information 202, the CPU 101 determines that the acquired shared information 202 is not information usable by the application B 110. The model name list may not be held by the application B 110, and may be included in a region on a network server or an external storage medium, such as an SD card or an HDD.

Alternatively, for example, it is assumed that an application name list corresponding to the shared information 202 is included in the shared information 202. In this case, the CPU 101 determines, as the availability determination, whether the application B 110 is included in the application name list corresponding to the shared information 202. If the application B 110 is included in the application name list, the CPU 101 determines that the acquired shared information 202 is information usable by the application B 110. If the application B 110 is not included in the application name list, the CPU 101 determines that the acquired shared information 202 is not information usable by the application B 110.

Next, a behavior of the CPU 101 will be described with reference to FIG. 2B. The behavior is performed when the application B 110 is independently activated not via the application A 109 in a state in which the application A 109 and the application B 110 are already installed on the mobile terminal 100.

Figure 2A:
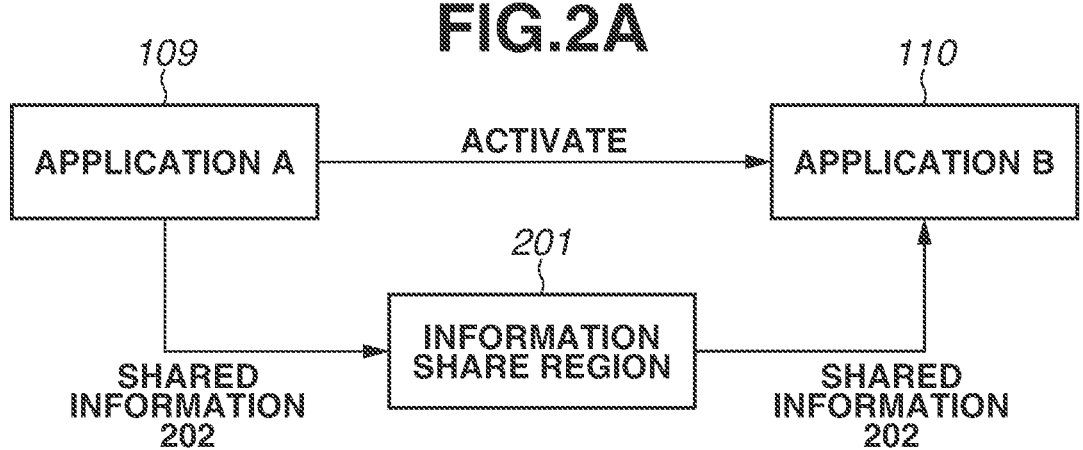
FIGS. 2A, 2B, and 2C illustrate a use case of cooperatively activating an application.
Figure 2B:
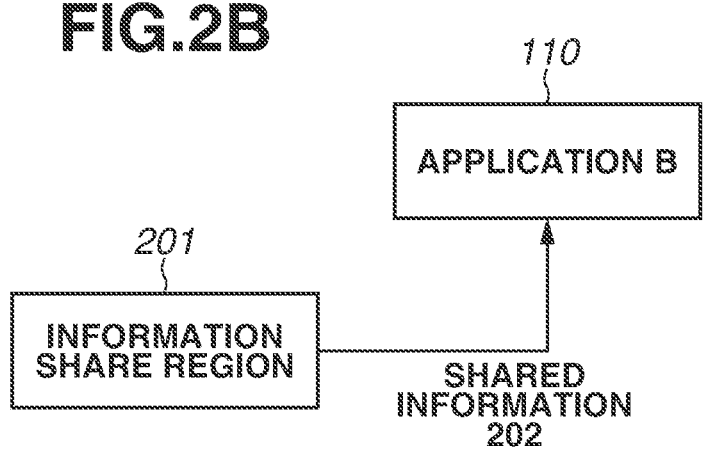

Similarly to FIG. 2A, if the CPU 101 identifies that registration information of a printer is generated by, for example, registration processing of a printer, the CPU 101 stores the generated registration information in the information share region 201 as the shared information 202. In the present exemplary embodiment, the CPU 101 refers to the information share region 201 even when the application B 110 is independently activated. If the shared information 202 is stored in the information share region 201, the CPU 101 acquires the shared information 202. The CPU 101 then executes the availability determination. If the CPU 101 determines that the shared information 202 is usable by the application B 110, the CPU 101 executes processing based on the shared information 202. If the CPU 101 determines that the shared information 202 is not usable by the application B 110, the CPU 101 does not execute the processing based on the shared information 202.

In this manner, in the present exemplary embodiment, the application A 109 stores the shared information 202 in the information share region 201 at a timing at which a printer is registered (registration information of a printer is generated). The application B 110 acquires the shared information 202 whichever activation of cooperative activation and independent activation is performed. When the shared information 202 is acquired, the CPU 101 determines whether the acquired shared information 202 is usable. With such a configuration, the CPU 101 can appropriately execute application cooperation between the application A 109 and the application B 110 regardless of whether the application B 110 is independently activated or cooperatively activated.

Figure 2C:
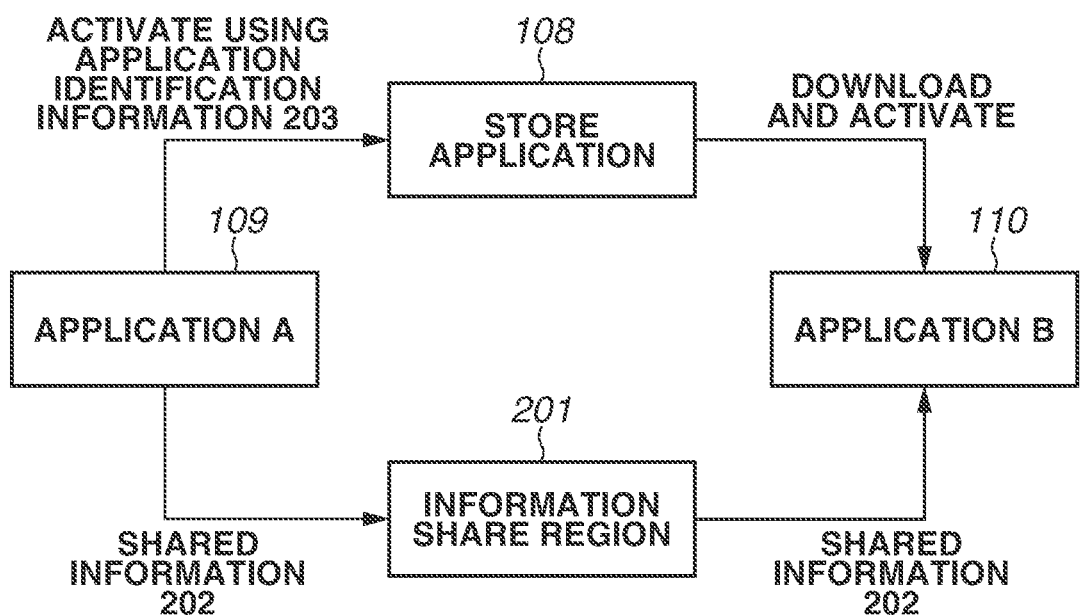

Next, a behavior of the CPU 101 performed when an operation for cooperatively activating the application B 110 is performed on a screen displayed by the application A 109 in a state where the application B 110 is not installed in the mobile terminal 100 will be described with reference to FIG. 2C.

Similarly to FIG. 2A, if the CPU 101 identifies that registration information of a printer is generated by registration processing of a printer, the CPU 101 stores the generated registration information in the information share region 201 as the shared information 202.

Even when an operation for cooperatively activating the application B 110 is performed on the screen displayed by the application A 109, the CPU 101 cannot activate the application B 110, in a case where the application B 110 is not installed in the mobile terminal 100. In general, the store application 108 is used to install the application B 110 onto the mobile terminal 100. Thus, the CPU 101 executes the following processing if an operation for cooperatively activating the application B 110 is performed on the screen displayed by the application A 109 in a state where the application B 110 is not installed on the mobile terminal 100.

The CPU 101 activates the store application 108. By activating the store application 108 using information (hereinafter, application identification information 203) that can identify a download target application (hereinafter, target application), the CPU 101 can display a screen for downloading the target application, on the display unit 105. At this time, the CPU 101 activates the store application 108 using the application identification information 203 that identifies the application B 110 as a target application. A screen for downloading the application B 110 is thereby displayed on the display unit 105. The CPU 101 accordingly receives an operation from the user, and downloads and installs the application B 110. At this time, the CPU 101 may automatically download the application B 110 without receiving an operation from the user. Thereafter, the CPU 101 receives an operation on the home screen performed on an application icon corresponding to the application B 110, or an operation performed on the screen displayed by the store application 108 (operation performed on the open button illustrated in FIG. 5). The CPU 101 activates the application B 110 in response to these operations, and executes processing similar to the processing illustrated in FIG. 2B. In other words, the CPU 101 executes processing executed when the application B 110 is independently activated.

In this manner, the CPU 101 downloads the application B 110 by using the store application 108, if an operation for cooperatively activating the application B 110 is performed on the screen displayed by the application A 109 in a state where the application B 110 is not installed on the mobile terminal 100. In the present exemplary embodiment, the CPU 101 refers to the information share region 201 also in the case of independent activation, and determines whether the shared information 202 is usable by the application B 110, as illustrated in FIG. 2B. Thus, printer registration information of the application A 109 can be appropriately shared with the application B 110 as the shared information 202, even if the application B 110 is independently activated by being downloaded via the store application 108.

The above description has been given of an example in which the CPU 101 always refers to the information share region 201 regardless of whether the application B 110 is cooperatively activated or independently activated. However, the present disclosure is not limited to this configuration. For example, the application A 109 and the application B 110 can individually register printers. Thus, the user may intentionally register different printers in the application A 109 and the application B 110 in some cases. In these cases, if cooperation between the application A 109 and the application B 110 is established, and a printer registered in the application A 109 is registered in the application B 110, a printer unintended by the user may be overwritten and registered in the application B 110. Further, the same printer may be already registered in the application A 109 and the application B 110 in some cases. In such cases, if the printer registered in the application A 109 is registered again in the application B 110, the application B 110 executes processing based on the shared information 202 each time the application B 110 is activated, and thus processing load applied at the time of activation may increase.

Thus, when the application B 110 is activated, the CPU 101 determines whether a printer is already registered in the application B 110. If a printer is already registered in the application B 110, the CPU 101 does not execute application cooperation. In other words, the CPU 101 does not change a printer already-registered in the application B 110.

Even when a printer is already registered in the application B 110, application cooperation may be executed again, in a case where the currently-stored shared information 202 is updated or changed from the shared information 202 previously used for application cooperation. For example, the shared information 202 is assumed to include information regarding updated date and time of the corresponding shared information 202. The application B 110 is assumed to store information regarding updated date and time that has been obtained when the shared information 202 has been previously used for application cooperation. By comparing information regarding updated date and time included in the newly-acquired shared information 202 and the information regarding updated date and time that has been obtained when the shared information 202 has been previously used for application cooperation, the application B 110 determines whether to execute application cooperation using the newly-acquired shared information 202. At this time, information to be compared with the information regarding updated date and time included in the newly-acquired shared information 202 may be another piece of information. For example, the information regarding the updated date and time may be compared with information regarding latest registered date and time of a printer in the application B 110.

If a printer already registered in the application B 110 is different from a printer to be registered based on the shared information 202, a dialog for causing the user to select whether to execute application cooperation may be displayed. Specifically, in a case where no printer is registered in the application B110, for example, the CPU 101 registers a printer registered in the application A 109 in the application B 110, after it is determined by the availability determination that the shared information 202 is information usable by the application B 110. As described above, processing of registering a printer registered in the application A 109 in the application B 110 can be rephrased as application cooperation. The application cooperation is executed in this case because, if no printer is registered in the application B 110, such a problem that a printer registered in the application B 110 is changed to a printer unintended by the user does not occur. In contrast, in a case where a printer is already registered in the application B 110, the CPU 101 displays a dialog for causing the user to select whether to execute application cooperation, after it is determined by the availability determination that the shared information 202 is information usable by the application B 110. The dialog can be rephrased as a dialog for causing the user to select whether to use the shared information 202, or whether to register a printer registered in the application A 109 in the application B 110. If an input indicating that application cooperation is to be executed is selected by the user, the CPU 101 executes application cooperation. If an input indicating that application cooperation is not to be executed is selected by the user, the CPU 101 does not execute application cooperation. In other words, a printer already registered in the application B 110 is not changed. This can prevent a printer registered in the application B 110, from being changed to a printer unintended by the user. After the dialog is displayed and an input indicating that application cooperation is to be executed is selected by the user, availability determination may be executed.

Even if the shared information 202 is acquired by the application B 110, the shared information 202 is not deleted from the information share region 201. In other words, even after the shared information 202 is acquired by the application B 110, the shared information 202 can be used in application cooperation with an application (e.g., the application C 111) different from the application B 110. With such a configuration, the application C 111 can also execute application cooperation even if the application C 111 is activated without the shared information 202 being updated in the application A 109 after the application B 110 acquires the shared information 202 and executes application cooperation. With such a configuration, usability improves in a configuration in which a plurality of applications can execute application cooperation. The shared information 202 is deleted, for example, in response to a deletion (uninstallation) of the application A 109 from the mobile terminal 100.

FIG. 3 is a flowchart illustrating a processing flow executed by the mobile terminal 100 using the application A 109. The processing illustrated in this flowchart is implemented, for example, by the CPU 101 loading a program corresponding to the application A 109 stored in the storage device 106 into the memory 104, and executing the program. The processing illustrated in this flowchart is started in a state where a screen for executing a function of the application A 109 is displayed on the display unit 105 by the application A 109.

In step S301, the CPU 101 executes printer registration processing in the application A 109. As described above, registration methods used in the registration processing executed in this step include the first to fifth registration methods.

In step S302, the CPU 101 determines whether to store registration information of the printer acquired in step S301 in the information share region 201 as the shared information 202. Specifically, the CPU 101 identifies a registration method used in the registration processing executed in step S301. If any one of the third registration method, the fourth registration method, and the fifth registration method is identified, it is determined that the registration information of the printer is not to be stored in the information share region 201 as the shared information 202. If the registered printer is a printer to which the mobile terminal 100 connects in compliance with the Wi-Fi Direct standard even when the first registration method is identified, it is determined that the registration information of the printer is not to be stored in the information share region 201 as the shared information 202. In contrast, if the second registration method is identified, it is determined that the registration information of the printer is to be stored in the information share region 201 as the shared information 202. If the first registration method is identified and the registered printer is a printer connected to a wireless LAN router via Wi-Fi, it is determined that the registration information of the printer is to be stored in the information share region 201 as the shared information 202. If the CPU 101 determines that the registration information of the printer is to be stored in the information share region 201 as the shared information 202 (YES in step S302), the processing proceeds to step S303. If the CPU 101 determines that the registration information of the printer is not to be stored in the information share region 201 as the shared information 202 (NO in step S302), the processing proceeds to step S304 without storing the registration information of the printer in the information share region 201 as the shared information 202.

In step S303, the CPU 101 stores the registration information of the printer acquired in step S301 in the information share region 201 as the shared information 202.

In step S304, the CPU 101 receives a cooperative activation operation of the application B 110. Specifically, the CPU 101 receives, for example, an operation performed on the icon 609 from the user.

The processing performed in step S304 may not be always executed successively after the processing performed in step S303 or S302. For example, after it is determined in step S302 that the shared information 202 is to be stored, the processing performed in step S303 may be executed after the icon 602 is operated and a print job is transmitted in the application A 109. Alternatively, for example, the processing in step S303 may be executed after the activation of the application A 109 is once ended and the application A 109 is subsequently activated again.

In step S305, the CPU 101 determines whether the application B 110 is installed on the mobile terminal 100. If it is determined that the application B 110 is installed on the mobile terminal 100 (YES in step S305), the processing proceeds to step S306. In step S306, the CPU 101 issues an instruction for activating the application B 110 using a known method that uses a uniform resource locator (URL) scheme. The application B 110 is thereby cooperatively activated. Thereafter, the CPU 101 uses the application B 110 to execute processing illustrated in FIG. 4, which will be described below. If it is determined that the application B 110 is not installed on the mobile terminal 100 (NO in step S305), the processing proceeds to step S307. In step S307, the CPU 101 issues an instruction for activating the store application 108, by a known method that uses a URL scheme, for example. At this time, the CPU 101 issues the instruction by adding, to the URL scheme, the application identification information 203 for the store application 108 identifying the application B 110. A screen for downloading the application B 110 is thereby displayed together with the activation of the store application 108. By receiving an operation for downloading the application B 110, from the user in this state, the CPU 101 can download and install the application B 110. After the application B 110 is installed, a region for activating the application B 110 is displayed in the store application 108. If the region for activating the application B 110 is operated by the user, the application B 110 is thereby activated. If the application B 110 is activated in this manner, the CPU 101 executes, using the application B 110, the processing illustrated in FIG. 4, which will be described below.

With the above-described configuration, it is possible to control, in an appropriate manner, whether to store registration information of a printer as shared information, depending on the registration method for the printer. In other words, it is possible to control, in an appropriate manner, whether to enable information acquired by the application A 109 to be acquired/used also in another application (whether to execute application cooperation), depending on the acquisition method of information held by the application A 109.

Figure 4:
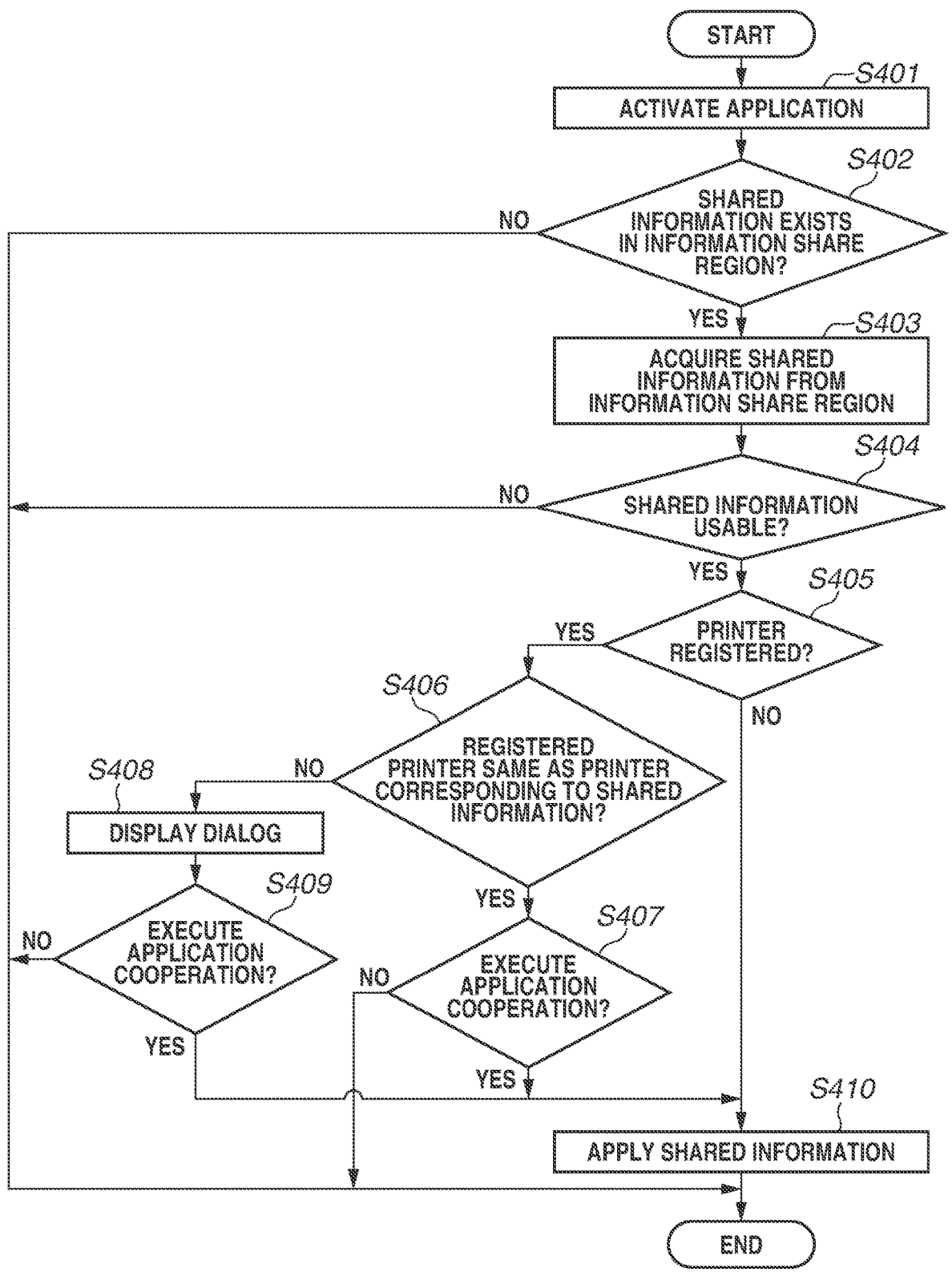
FIG. 4 is a flowchart illustrating a processing flow executed by the mobile terminal using the application B.

FIG. 4 is a flowchart illustrating a processing flow executed by the mobile terminal 100 using the application B 110. The processing illustrated in this flowchart is implemented by the CPU 101 loading a program corresponding to the application B 110 stored in the storage device 106 into the memory 104, and executing the program, for example.

In step S401, the CPU 101 activates the application B 110. The processing in step S401 is executed being triggered by, for example, the reception of a cooperative activation operation of the application B 110 via the application A 109, the reception of an activation instruction of the application B 110 via the store application 108, and the reception of an activation instruction of the application B 110 via the home screen.

In step S402, the CPU 101 determines whether the shared information 202 exists in the information share region 201. If the CPU 101 determines that the shared information 202 exists in the information share region 201 (YES in step S402), the processing proceeds to step S403. In step S403, the CPU 101 acquires the shared information 202. In the present exemplary embodiment, the CPU 101 does not delete the shared information 202 from the information share region 201 even when the CPU 101 acquires the shared information 202 using the application B 110. If the CPU 101 determines that the shared information 202 does not exist in the information share region 201 (NO in step S402), the CPU 101 ends the processing without executing processing of registering a printer registered in the application A 109 in the application B 110 (without executing application cooperation). Examples of a situation in which the shared information 202 is not stored in the information share region 201 include a situation in which the information share region 201 is, for example, an external server, and the mobile terminal 100 cannot access the external server using the application A 109 due to, for example, a communication error and an authentication error. The examples of the situation further include a situation in which registration processing of a printer is unexecuted in the application A 109.

In step S404, the CPU 101 executes availability determination. If the CPU 101 determines that the acquired shared information 202 is information usable by the application B 110 (YES in step S404), the processing proceeds to step S405. In contrast, if the CPU 101 determines that the acquired shared information 202 is not information usable by the application B 110 (NO in step S404), the CPU 101 ends the processing without executing processing of registering a printer registered in the application A 109 in the application B 110 (without executing application cooperation).

In step S405, the CPU 101 determines whether a printer has already been registered in the application B 110 (whether a device with which communication is to be performed using the application B 110 has been set). If the CPU 101 determines that a printer has not been registered in the application B 110 (NO in step S405), the processing proceeds to step S410. If the CPU 101 determines that a printer has already been registered in the application B 110 (YES in step S405), the processing proceeds to step S406.

In step S406, the CPU 101 determines whether the printer registered in the application B 110 is the same printer as a printer corresponding to the shared information 202. In other words, the determination is processing of determining whether the shared information 202 and registration information of the printer registered in the application B 110 are the same. If the CPU 101 determines that the registered printer is the same printer (YES in step S406), the processing proceeds to step S407. If the CPU 101 determines that the registered printer is not the same printer (NO in step S406), the processing proceeds to step S408. In some cases, a plurality of printers is registered in the application B 110. In such cases, the processing proceeds to step S407 if the CPU 101 determines that the printer corresponding to the shared information 202 is the same as any of the plurality of printers. If the printer corresponding to the shared information 202 is different from all of the plurality of printers, the processing proceeds to step S408.

In step S407, the CPU 101 determines whether to execute application cooperation. In the determination, the CPU 101 compares, for example, information regarding updated date and time included in the newly-acquired shared information 202 and information regarding updated date and time that has been obtained when the shared information 202 has been previously used for application cooperation. If the former date and time is later than the latter date and time, the CPU 101 determines to execute application cooperation. If the former date and time is earlier than the latter date and time, the CPU 101 determines not to execute application cooperation. Alternatively, in the determination, the CPU 101 compares, for example, information regarding updated date and time included in the newly-acquired shared information 202 and information regarding latest registered date and time of a printer in the application B 110. If the former date and time is later than the latter date and time, the CPU 101 determines to execute application cooperation. If the former date and time is earlier than the latter date and time, the CPU 101 determines not to execute application cooperation. If the CPU 101 determines to execute application cooperation (YES in step S407), the processing proceeds to step S410. If the CPU 101 determines not to execute application cooperation (NO in step S407), the CPU 101 ends the processing without executing processing of registering a printer registered in the application A 109 in the application B 110 (without executing application cooperation).

If it is determined that the registered printer is the same printer (YES in step S406), the processing may always proceed to step S410 without executing the processing in step S407.

In step S408, the CPU 101 displays a dialog for allowing the user to select whether to register a printer registered in the application A 109 in the application B 110 (whether to execute application cooperation).

In step S409, the CPU 101 determines whether the user has selected to execute application cooperation on the dialog displayed in step S408. If the CPU 101 determines that the user has selected to execute application cooperation (YES in step S409), the processing proceeds to step S410. If the CPU 101 determines that the user has selected not to execute application cooperation (NO in step S409), the CPU 101 ends the processing without executing processing of registering a printer registered in the application A 109 in the application B 110 (without executing application cooperation).

If the CPU 101 determines that the registered printer is not the same printer (NO in step S406), the CPU 101 may always end the processing without executing processing of registering a printer registered in the application A 109 in the application B 110 (without executing application cooperation), without executing the processing in steps S408 and S409.

In step S410, the CPU 101 registers a printer registered in the application A 109 in the application B 110 by using the shared information 202. In the present exemplary embodiment, the shared information 202 is not deleted from the information share region 201 even if the printer registered in the application A 109 is registered in the application B 110.

The processing executed by the application B 110 has been described with reference to FIG. 4. Similar processing can also be executed by the application C 111.

With the above-described configuration, both the application B 110 and the application C 111 can acquire the shared information 202 regardless of an activation timing, and execute application cooperation with the application A 109.

Also in a case where the application B 110 is independently activated, the same printer as the printer used in the application A 109 is highly likely to be used in the application B 110, and thus application cooperation is desirably executed. In the present exemplary embodiment, the CPU 101 executes the processing illustrated in FIG. 4 regardless of whether the application B 110 is cooperatively activated or independently activated, and thus the shared information 202 can be appropriately used.

The description will be given of a configuration in which a plurality of printers is registered in the application A 109, and a plurality of pieces of registration information is stored in the information share region 201 as the shared information 202. The configurations of the devices in a second exemplary embodiment are similar to those described in the first exemplary embodiment unless otherwise stated.

FIG. 7 is a flowchart illustrating a processing flow executed by the mobile terminal 100 using the application B 110. The processing illustrated in this flowchart is implemented by the CPU 101 loading, for example, a program corresponding to the application B 110 stored in the storage device 106 into the memory 104, and executing the program.

In step S701, the CPU 101 activates the application B 110. The processing is similar to the processing performed in step S401.

In step S702, the CPU 101 determines whether the shared information 202 exists in the information share region 201. The processing is similar to the processing performed in step S402. If the CPU 101 determines that the shared information 202 exists in the information share region 201 (YES in step S702), the processing proceeds to step S703. In step S703, the CPU 101 acquires the shared information 202. In contrast, if the CPU 101 determines that the shared information 202 does not exist in the information share region 201 (NO in step S702), the CPU 101 ends the processing without executing processing of registering a printer registered in the application A 109 in the application B 110 (without executing application cooperation).

In step S704, the CPU 101 extracts registration information of a printer usable by the application B 110 from a list of registration information included in the shared information 202. The extraction is performed by executing the availability determination as described in the first exemplary embodiment, on each piece of registration information included in the list.

In step S705, the CPU 101 determines whether any registration information has been extracted in step S704. If the CPU 101 determines that registration information has been extracted in step S704 (YES in step S705), the processing proceeds to step S706. In contrast, if the CPU 101 determines that no registration information has been extracted in step S704 (NO in step S705), the CPU 101 ends the processing without executing processing of registering a printer registered in the application A 109 in the application B 110 (without executing application cooperation).

In step S706, the CPU 101 acquires information regarding updated date and time of each piece of extracted registration information. In step S707, the CPU 101 identifies registration information having the latest information regarding the updated date and time. A printer corresponding to the registration information identified in this step becomes a candidate of a printer to be registered in the application B 110.

The identification method of registration information used in step S706 is not limited to the identification method in the above-described configuration. For example, registration information initially extracted from a list of registration information included in the shared information 202 may be identified. Alternatively, for example, by displaying a list of registration information included in the shared information 202 and allowing the user to select any registration information from the list, the registration information selected by the user may be identified.

In step S708, the CPU 101 determines whether a printer has already been registered in the application B 110 (whether a device with which communication is to be performed using the application B 110 has been set). The processing is similar to the processing performed in step S405. If the CPU 101 determines that a printer has not been registered in the application B 110 (NO in step S708), the processing proceeds to step S713. If the CPU 101 determines that a printer has already been registered in the application B 110 (YES in step S708), the processing proceeds to step S709.

In step S709, the CPU 101 determines whether the printer registered in the application B 110 is the same printer as a printer corresponding to the registration information identified in step S707. If the CPU 101 determines that the registered printer is the same printer (YES in step S709), the processing proceeds to step S710. If the CPU 101 determines that the registered printer is not the same printer (NO in step S709), the processing proceeds to step S711. In some cases, a plurality of printers is registered in the application B 110. In such cases, if the CPU 101 determines that the printer corresponding to the registration information identified in step S707 is the same as any of the plurality of printers, the processing proceeds to step S710. If the printer corresponding to the registration information identified in step S707 is different from all of the plurality of printers, the processing proceeds to step S711.

In step S710, the CPU 101 determines whether to executes application cooperation. In the determination, the CPU 101 compares, for example, information regarding updated date and time that corresponds to the registration information identified in step S707 and information regarding updated date and time that has been obtained when the shared information 202 has been previously used for application cooperation. If the former date and time is later than the latter date and time, the CPU 101 determines to execute application cooperation. If the former date and time is earlier than the latter date and time, the CPU 101 determines not to execute application cooperation. Alternatively, in the determination, the CPU 101 compares, for example, information regarding updated date and time that corresponds to the registration information identified in step S707 and information regarding latest registered date and time of a printer in the application B 110. If the former date and time is later than the latter date and time, the CPU 101 determines to execute application cooperation. If the former date and time is earlier than the latter date and time, the CPU 101 determines not to execute application cooperation. If the CPU 101 determines to execute application cooperation (YES in step S710), the processing proceeds to step S713. If the CPU 101 determines not to execute application cooperation (NO in step S710), the CPU 101 ends the processing without executing processing of registering a printer registered in the application A 109 in the application B 110 (without executing application cooperation).

If it is determined that the registered printer is the same printer (YES in step S709), the processing may always proceed to step S713 without executing the processing in step S710.

In step S711, the CPU 101 displays a dialog for allowing the user to select whether to register a printer registered in the application A 109 in the application B 110 (whether to execute application cooperation). The processing is similar to the processing performed in step S408.

In step S712, the CPU 101 determines whether the user has selected to execute application cooperation, in the dialog displayed in step S711. The processing is similar to the processing performed in step S409. If the CPU 101 determines that the user has selected to execute application cooperation (YES in step S712), the processing proceeds to step S713. If the CPU 101 determines that the user has selected not to execute application cooperation (NO in step S712), the CPU 101 ends the processing without executing processing of registering a printer registered in the application A 109 in the application B 110 (without executing application cooperation).

If the CPU 101 determines that the registered printer is not the same printer (NO in step S709), the CPU 101 may always end the processing without executing processing of registering a printer registered in the application A 109 in the application B 110 (without executing application cooperation), without executing the processing in steps S711 and S712.

In step S713, the CPU 101 registers a printer registered in the application A 109 in the application B 110 by using the shared information 202. The processing is similar to the processing performed in step S410.

The processing executed by the application B 110 has been described with reference to FIG. 7. Similar processing can also be executed by the application C 111.

With the above-described configuration, application cooperation can be appropriately executed even if registration information of a plurality of printers registered in the application A 109 is stored as the shared information 202.

In the above-described exemplary embodiment, the description has been given of a configuration in which download of the application B 110 is executed by the store application 108. However, the present disclosure is not limited to this configuration. For example, the CPU 101 may download the application B 110 from a web page. In this case, processing of activating the store application 108 becomes processing of activating a program for displaying a web page, in the above-described configuration. Even when the program for displaying a web page is activated, a web page for downloading the target application can be directly displayed by using information regarding a target application. The CPU 101 may perform the installation of the application B 110 using an installer after downloading the application B 110 using the store application 108. The CPU 101 may execute the download and install of the application B 110 from a personal computer.

In the above-described exemplary embodiment, the description has been given of a configuration in which, regardless of whether the application B 110 is independently activated or cooperatively activated, the CPU 101 refers to the information share region 201 and acquires the shared information 202. Nevertheless, the present disclosure is not limited to this configuration. For example, when the application B 110 is cooperatively activated, application cooperation may be executed by using information added to a URL scheme, as the shared information 202. In this case, the CPU 101 therefore adds information to the URL scheme if a cooperative activation operation of the application B 110 is performed.

In the above-described exemplary embodiment, a printing application is exemplified as the application A 109, the application B 110, or the application C 111, and registration information is exemplified as the shared information 202. However, the present disclosure is not limited to this configuration. In other words, the application A 109 and the application B 110 are only required to be applications that can share information with each other, and the functions of the applications are not limited. For example, a device to be registered in each application may be a device other than a printer. The content of the shared information 202 is also not limited. For example, each application may be an application for remotely controlling a camera, and a camera may be registered in each application. Alternatively, each application may be, for example, an application for controlling a smart speaker, and a smart speaker may be registered in each application. Alternatively, the application A 109 may be, for example, a camera application, and the application B 110 may be a photo album creation application. In this case, the shared information 202 may be, for example, image data that can be arranged in a photo album. In this case, specific processing in application cooperation includes processing of converting the shared information 202 (image data) into a thumbnail and displaying the thumbnail, and processing of storing the shared information 202 in a region referable by the application B 110.

In the above-described exemplary embodiment, cooperation between the application A 109, the application B 110, and the application C 111 has been described. However, the shared information 202 handled by the application A 109 can also be used in another application aside from the application B 110 and the application C 111. More specifically, also in the other application, the shared information 202 handled by the application A 109 can be used in a plurality of applications by executing processing similar to the processing executed when the application B 110 or the application C 111 is activated.

In the above-described exemplary embodiment, the description has been given of a configuration of controlling whether to store registration information in the information share region 201, depending on the registration method. However, the present disclosure is not limited to this configuration. For example, while registration information is stored in the information share region 201 regardless of a registration method, it may be controlled whether to acquire registration information using the application B 110 or the application C 111, depending on the registration method. In this configuration, the application A 109 stores, for example, information regarding a registration method, a communication path, and a communication method that have been used for acquiring the registration information together with the registration information, in the information share region 201. The application B 110 or the application C 111 acquires the information regarding the registration method, the communication path, and the communication method that have been used for acquiring the registration information, and determines whether to acquire the registration information based on a case identified using the acquired information, before acquiring the registration information. In the above-described exemplary embodiment, if it is identified that registration information has been acquired using a registration method (e.g., second registration method) used in the case of storing registration information in the information share region 201, the application B 110 or the application C 111 acquires the registration information and executes application cooperation. In contrast, in the above-described exemplary embodiment, if it is identified that registration information has been acquired using a registration method (e.g., third registration method) used in the case of not storing registration information in the information share region 201, the application B 110 or the application C 111 does not acquire the registration information and does not execute application cooperation. With such a configuration, application cooperation can be appropriately executed.

The above-described exemplary embodiment is also implemented by executing the following processing. More specifically, the processing is processing of supplying software (program) implementing the functions of the above-described exemplary embodiment, to a system or an apparatus via a network or various storage media, and a computer (e.g., CPU, and micro processing unit (MPU)) of the system or the apparatus reading the program and executing the program. The program may be executed by one computer, or may be executed by a plurality of computers in cooperation with each other. All of the above-described processes may not be implemented by software, and part or all of the processes may be implemented by hardware such as an application specific integrated circuit (ASIC). All of the processes may not be performed by one CPU, and the processes may be performed by a plurality of CPUs in cooperation with each other.

According to an exemplary embodiment of the present disclosure, it is possible to execute program cooperation more appropriately.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2020-033879, filed Feb. 28, 2020, which is hereby incorporated by reference herein in its entirety.

What is claimed is:

1. A control method of an information processing apparatus, the control method comprising:
   acquiring predetermined information regarding a communication apparatus using a first program; and
   executing processing that is based on the predetermined information acquired by the first program using a second program different from the first program, based on an activation of the second program,
   wherein, in a case where the predetermined information is acquired by the first program using a first method, control is performed such that the processing that is based on the predetermined information is executed by the second program based on the activation of the second program, and wherein, in a case where the predetermined information is acquired by the first program using a second method different from the first method, control is performed such that the processing that is based on the predetermined information is not executed by the second program even if the second program is activated.

2. The control method according to claim 1, wherein the first method includes acquiring the predetermined information from the communication apparatus connected to an external access point to which the information processing apparatus connects, via the external access point.

3. The control method according to claim 1, further comprising:

transmitting, via a connection between the information processing apparatus and the communication apparatus, information regarding an external access point to the communication apparatus, wherein the first method includes acquiring the predetermined information via the external access point, after connection between the external access point and the communication apparatus is established based on the transmitted information regarding the external access point.

4. The control method according to claim 1, further comprising:

receiving information regarding an internal access point of the communication apparatus transmitted to the information processing apparatus via a first connection between the information processing apparatus and the communication apparatus, and establishing a second connection between the internal access point and the information processing apparatus based on the received information regarding the internal access point, wherein the first method includes acquiring the predetermined information via the second connection, and wherein the second connection is maintained after the predetermined information is acquired.

5. The control method according to claim 1, wherein the second method includes acquiring the predetermined information from the communication apparatus to which the information processing apparatus connects via Wi-Fi Direct®.

6. The control method according to claim 1, wherein the second method includes acquiring the predetermined information, after information regarding an internal access point of the communication apparatus is transmitted to the information processing apparatus via a first connection between the information processing apparatus and the communication apparatus, and a second connection between the internal access point and the information processing apparatus is established based on the transmitted information regarding the internal access point, via the second connection, wherein the second connection is disconnected after the predetermined information is acquired, and wherein the second connection is re-established in a case where an instruction to communicate with the communication apparatus is issued in the first program.

7. The control method according to claim 1, wherein the second method includes acquiring the predetermined information, after information regarding an internal access point of the communication apparatus is transmitted to the communication apparatus via a first connection between the information processing apparatus and the communication apparatus, and a second connection between the internal access point and the information processing apparatus is established based on the transmitted information regarding the internal access point, via the second connection, and wherein communication of different information different from the predetermined information is further executed via the second connection, and the second connection is disconnected after the predetermined information is acquired and communication of the different information is executed.

8. The control method according to claim 1, wherein the processing, which is to be executed by the second program, based on the predetermined information acquired by the first program, is processing of registering the communication apparatus corresponding to the predetermined information in the second program as an apparatus with which communication is to be performed using the second program.

9. The control method according to claim 1, wherein, in a case where the predetermined information is acquired, the first program stores the predetermined information in a predetermined storage region, and wherein, in a case where the predetermined information stored in the predetermined storage region is acquired by the second program, the processing that is based on the predetermined information is executed.

10. The control method according to claim 9, wherein the first program stores the predetermined information in the predetermined storage region in response to the acquisition of the predetermined information.

11. The control method according to claim 9, wherein, in a case where the second program is installed in the information processing apparatus, the second program is activated in response to an operation performed on a screen displayed by the first program, and wherein the first program stores the predetermined information in the predetermined storage region in response to the operation.

12. The control method according to claim 9, wherein, in a case where the predetermined information is acquired by the first program using the first method, control is performed such that the predetermined information is stored in the predetermined storage region, and in a case where the predetermined information is acquired by the first program using the second method, control is performed such that the predetermined information is not stored in the predetermined storage region.

13. The control method according to claim 9, wherein, in a case where the predetermined information is acquired by the first program using the first method, control is performed such that the predetermined information stored in the predetermined storage region is acquired by the second program, and in a case where the predetermined information is acquired by the first program using the second method, control is performed such that the predetermined information stored in the predetermined storage region is not acquired by the second program.

14. The control method according to claim 9, wherein the predetermined information is not deleted from the predetermined storage region even if the predetermined information is acquired by the second program, and wherein, based on an activation of a third program different from the first program and the second program after the acquisition of the predetermined information by the second program, the processing that is based on the predetermined information acquired by the first program is executed by the third program.

15. The control method according to claim 1,
wherein the processing that is based on the predetermined information is newly executed by the second program based on an activation of the second program, in a case where the second program is activated in a state where the processing based on the predetermined information has already been executed by the second program, and the predetermined information corresponding to the already-executed processing and the predetermined information acquired by the first program using the first method are different, and
wherein the processing that is based on the predetermined information is not newly executed by the second program even if the second program is activated, in a case where the second program is activated in a state in which the processing based on the predetermined information has already been executed by the second program, and the predetermined information corresponding to the already-executed processing and the predetermined information acquired by the first program using the first method are same.

16. The control method according to claim 1,
wherein, in a case where the communication apparatus corresponding to the predetermined information acquired by the first program using the first method is a communication apparatus usable by the second program, the processing that is based on the predetermined information is newly executed by the second program based on the activation of the second program, and
wherein, in a case where the communication apparatus corresponding to the predetermined information acquired by the first program using the first method is not a communication apparatus usable by the second program, the processing that is based on the predetermined information is not newly executed by the second program even if the second program is activated.

17. The control method according to claim 1, wherein the first program and the second program are application programs.

18. The control method according to claim 1, wherein the first program and the second program are programs that generate a print job for causing the communication apparatus corresponding to the predetermined information to execute printing.

19. The control method according to claim 1, wherein the predetermined information includes at least one of a media access control (MAC) address, a Bonjour name, an internet protocol (IP) address, a model name of the communication apparatus, capability information of the communication apparatus, or information regarding date and time on which the predetermined information is acquired.

20. An information processing apparatus comprising:
an acquisition unit configured to acquire predetermined information regarding a communication apparatus, by using a first program; and
an execution unit configured to execute processing that is based on the predetermined information acquired by the first program, based on an activation of a second program different from the first program, by using the second program,
wherein, in a case where the predetermined information is acquired by the first program using a first method, control is performed such that the processing that is based on the predetermined information is executed by the second program based on an activation of the second program, and
wherein, in a case where the predetermined information is acquired by the first program using a second method different from the first method, control is performed such that the processing that is based on the predetermined information is not executed by the second program even if the second program is activated.

* * * * *